June 21, 1932.  W. McCOLLUM  1,864,456
SPLASH GUARD
Filed March 15, 1932  2 Sheets-Sheet 1

INVENTOR
WILLIAM McCOLLUM
BY
ATTORNEY

June 21, 1932.  W. McCOLLUM  1,864,456
SPLASH GUARD
Filed March 15, 1932   2 Sheets-Sheet 2

INVENTOR
WILLIAM McCOLLUM
BY
ATTORNEY

Patented June 21, 1932

1,864,456

UNITED STATES PATENT OFFICE

WILLIAM McCOLLUM, OF RAHWAY, NEW JERSEY, ASSIGNOR TO TINGLEY RELIANCE RUBBER CORPORATION, OF RAHWAY, NEW JERSEY, A CORPORATION OF NEW JERSEY

SPLASH GUARD

Application filed March 15, 1932. Serial No. 598,954.

This invention relates to means for attaching a splash guard to the end of an automobile fender and is particularly designed to prevent soft or liquid material which has been spattered against the inside of the fender running down over the outside of the apron or splash guard, particularly when the upper end of this is located on the inside of the fender according to the prevailing practice.

Another object of the invention is to provide means for collecting at the upper part spatter material which may run over the outside of the upper end of the apron and discharging it at a lower point at the inside of the apron.

Another object of the invention is to provide a damming or baffling device for stopping the flow of liquid or semi-liquid material which runs over the upper edge of one side of the apron and for discharging such material at a lower point upon the other side.

Another object of the invention is to provide means forming a pocket, preferably flexible, associated with the apron or the splash guard for encasing the lower end of an automobile fender from side to side thereof.

Another object of the invention is to provide the upper end of a splash guard apron with a hose or stocking-like device for encasing the lower end of an automobile fender.

Another object of the invention is to associate with the clamps formed on a splash guard apron means for encasing the lower end of an automobile fender from side to side thereof.

Another object of the invention is to provide in a molded, rubber splash guard, having clamps molded integrally with it for embracing and engaging the edge of an automobile fender, an integrally molded member for housing the lower edge of an automobile fender.

Another object of the invention is to form a splash guard having a rubber apron and rubber attaching jaws molded and vulcanized integrally therewith with a member for housing the portion of a fender adjacent its points of engagement with the clamps, such housing member being molded integrally with the sides of the jaws and with the face of the apron which carries such jaws. A further object of the invention is to form such housing member as a receptacle for liquid or semi-liquid matter, and to vent such receptacle at one or more places for the escape or discharge of such received material.

In the drawings accompanying this specification one practicable embodiment of my invention is illustrated, in which drawings.

The prevailing practice of mounting splash guards or fender flaps on the depending ends of automobile fenders is to clamp the apron to the fender and have the upper end of the apron located at the inner or wheel side of the lower end of the fender. Various forms of clamping devices have been resorted to for holding the guard in position, most of which bring the upper end or edge of the apron in more or less close proximity to the inner face of the fender. The main purpose of the fender flap or splash guard is to prevent the spatters from the wheel being thrown back on various portions of the auto. When the spatters from the wheel are liquid or semi-liquid in nature, those which strike the rearward inside of the fender flow down and run from it onto the outside of the splash guard apron soiling it and making an unsightly appearance. It is one of the purposes of my present invention to afford means for preventing this soiling of the outer and most conspicuous surface of the splash guard apron, and which is the part most in view. I shall now describe my invention in detail.

Figure 1:
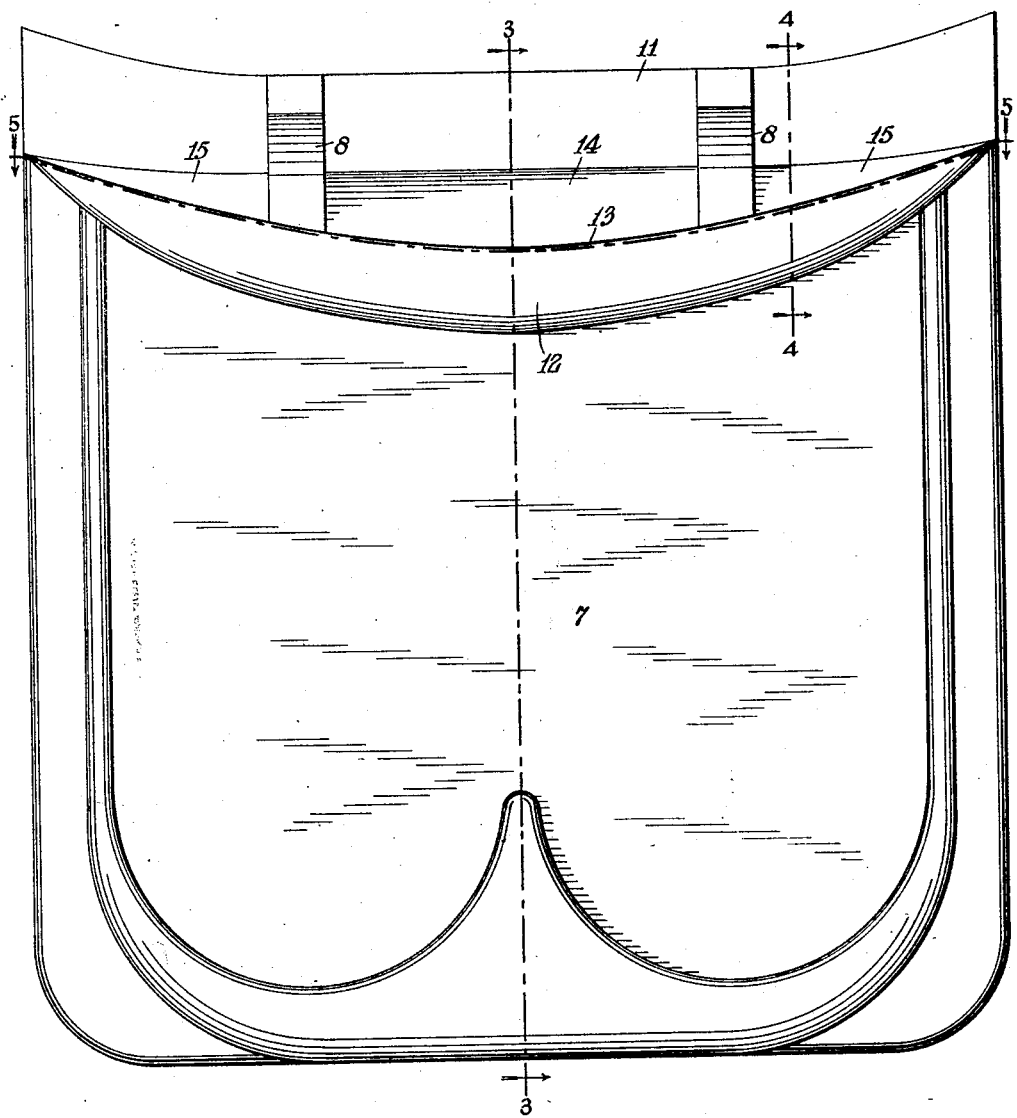
Figure 1 is a view of the outer face of my improved splash guard, in its preferred form.
Figure 2:
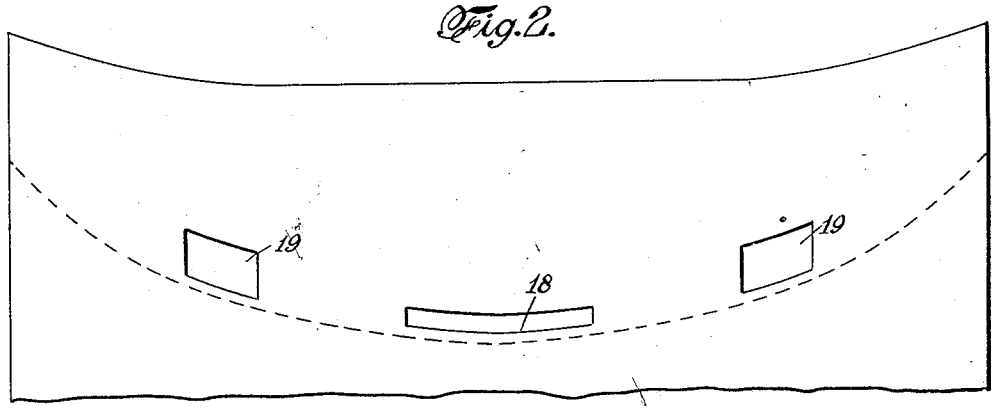
Fig. 2 is a view of the inner side of the upper portion of the device illustrated in Fig. 1.
Figure 3:
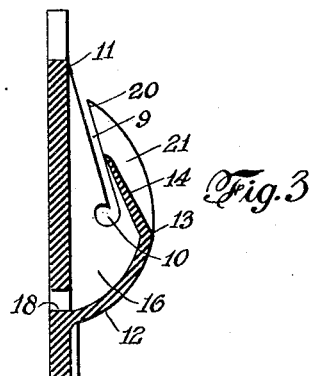
Fig. 3 is a vertical, sectional view taken at about line 3—3 of Fig. 1.
Figure 4:
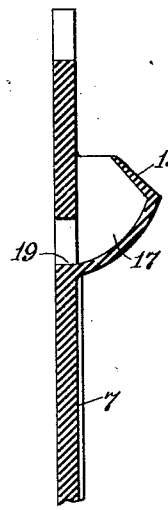
Fig. 4 is another sectional view taken at about line 4—4 of Fig. 1.
Figure 5:
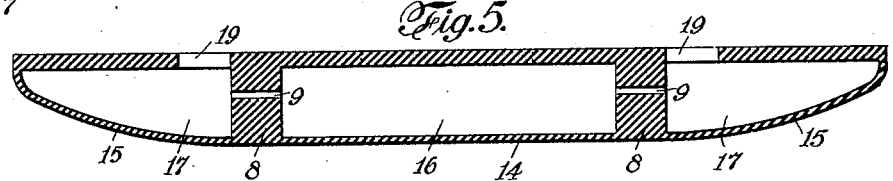
Fig. 5 is a horizontal view taken at about the plane of line 5—5 of Fig. 1.

The apron 7 of the splash guard is illustrated in conventional form. It is preferably made of molded and vulcanized rubber. I have illustrated upon the outer face of this apron a pair of molded rubber clamps 8—8, these being of a form which I have commercially employed. Each of them is provided with a slot 9 running into an enlarged recess 10 for engaging the lower edge and bead of an automobile fender. My present improvement consists of a preferably flexible damming member integrally molded with the apron for receiving and encasing or housing the lower end of an automobile fender from side to side thereof. This member is also preferably molded integrally with the outer or free jaw members of the clamps. A larger and higher portion 11 of this member is shown disposed between these clamps. By reference particularly to the vertical section of Fig. 3 it will be seen that the lower part of this damming member springs from the outer face of the fender and curves outwardly and upwardly at 12, and then at the point 13 abruptly slopes inwardly affording a curtain-like portion 14 which extends to the fender engaging faces 20 of the free jaws 21 of the clamps and in position to closely engage the outer surface of the fender to which the clamps are applied.

To conform to a prevailing shape or form of the lower end of an automobile fender which this damming member is particularly designed to encase and house its lower end from side to side thereof generally circular in its lower part from side to side and is somewhat crescent-shaped, there being curtains at the ends of the crescent or at the sides of the apron which extend from the outer sides of the free jaws of the clamps, also at their clamping faces. These portions are indicated by the reference characters 15.

Whatever material which is capable of flowing which finds access to the outer face of the top of the apron and enters the receiving portions 16 and 17—17 is permitted to escape through vents afforded by suitable openings formed through the apron at the bottom of these receptacles, there being an elongated opening 18 for the receptacle 16 and smaller openings 19 for the receptacles 17—17. The receptacle 16 in the center of the device is larger because a larger amount of fluid material is apt to be discharged upon the apron at this region than at the sides. It will be noted that the pocket formed by this receptacle 16 is of such depth that its bottom lies spaced below the end of the fender when applied thereto, so that a substantial space is provided for the water, mud or the like which finds its way into the receptacle.

The edges of the lower ends of automobile fenders are generally of a curved formation and the present illustrated design of my device is formed in accordance with such prevailing practice, but it is, of course, apparent that the shape of the damming member will be caused to conform to the prevailing type or style of fender end.

Although I have illustrated my improved device as associated with clamping jaws carried by the apron which is particularly adapted for many of the fenders of prevailing design, yet some of the fenders which are now in use are of such form and proportion that the damming device alone is sufficient to hold the apron in place when the device is pushed up on the fender. Of course it is to be understood that some changes could be made in the shape of this damming device so that it would be in the nature of a hose for more closely fitting and adhering to the fender.

It will also be noted that the clamps may be mounted entirely within and free of the web of the damming device and that they need not necessarily be molded integrally with the damming device or with the apron, although better practice would indicate molding and vulcanizing all the parts as an integral structure.

Having thus described my invention, what I claim and desire to secure by Letters Patent is:

1. In a wheel fender splash guard, the combination with a rubber apron, of a flexible fender and housing member formed integrally with the apron and extending outwardly from one of its faces at a short distance below its upper end, and forming a pocket to receive and encase the lower end of the fender from side to side thereof, said pocket being of such depth that its bottom lies below the fender end when the guard is attached thereto whereby a substantial space is provided between the fender end and bottom of the pocket.

2. A splash guard formed of vulcanized rubber and comprising an apron and a flexible fender and housing member formed integrally therewith and extending outwardly from one of its faces, and forming a pocket to receive and encase the lower end of the fender from side to side thereof, said pocket being of such depth that its bottom lies below the fender end when the guard is attached thereto whereby a substantial space is provided between the fender end and bottom of the pocket.

3. In a wheel fender splash guard, the combination with a rubber apron, of a flexible fender end housing member formed integrally with the apron and disposed at its outer face at a short distance below its upper end, and forming a pocket to receive and encase the lower end of the fender from side to side thereof, said pocket being of such depth that its bottom lies below the fender end when the guard is attached thereto whereby a substantial space is provided between the fender end and bottom of the pocket.

4. In a wheel fender splash guard, the combination with a rubber apron, of a flexible fender end housing member formed integrally with the apron and disposed at its outer face at a short distance below its upper end, and forming a pocket to receive and encase the lower end of the fender from side to side thereof, and to locate and position the said upper end of the apron upon the inner side of the fender, said pocket being of such depth that its bottom lies below the fender end when the guard is attached thereto whereby a substantial space is provided between the fender end and bottom of the pocket.

5. In a wheel fender splash guard, the combination with a rubber apron, of a flexible spatter receiving dam formed integrally with the apron and disposed at its outer face at a distance below its upper end, and constructed and adapted to receive and encase the lower end of a wheel fender, there being one or more openings through the apron within the said dam.

6. A splash guard formed of vulcanized rubber and comprising an apron, a pair of clamps carried by the apron at its outer face and each having a free jaw formed with a face to engage the outer surface of a fender, a spatter receiving dam integrally connected with the outer face of the apron below the clamps and having a curtain portion molded to the sides of such free jaws and extending to the fender engaging faces thereof.

7. A splash guard formed of vulcanized rubber and comprising an apron, a pair of clamps carried by the apron at its outer face inwardly of its side edges and each having a free jaw formed with a face to engage the outer surface of a fender, a spatter receiving dam integrally connected with the outer face of the apron below the clamps and having a curtain portion molded to the sides of such free jaws and extending from side to side of the apron, there being a plurality of openings through the apron within the said dam, at least one of said openings being between the two clamps, and at least one of said openings being located upon the outer side of each of the clamps.

8. A splash guard comprising an apron formed of vulcanized rubber, a pair of clamps carried by the apron at its outer face and each having a free jaw formed with a face to engage the outer surface of a fender, a spatter receiving dam integrally connected with the outer face of the apron below the clamps and having a curtain portion constructed and adapted to engage the outer face of the fender.

9. A splash guard comprising an apron formed of vulcanized rubber, a pair of clamps carried by the apron at its outer face and each having a free jaw formed with a face to engage the outer surface of a fender, a spatter receiving dam integrally connected with the outer face of the apron below the clamps and having a curtain portion constructed and adapted to engage the outer face of the fender, there being a plurality of openings through the apron within the said dam, at least one of said openings being between the two clamps, and at least one of said openings being located upon the outer side of each of the clamps.

10. An automobile fender splash guard comprising a flexible apron and means for deflecting water from the outer to the inner face of the apron, and comprising a dam integrally connected to the outer face of the apron at a short distance below its upper end, there being one or more vents through the apron within the dam.

Signed at Rahway, New Jersey, this 8th day of March, 1932.

WILLIAM McCOLLUM.